United States Patent [19]

Suesada et al.

[11] Patent Number: 5,200,812
[45] Date of Patent: Apr. 6, 1993

[54] SAMPLING FREQUENCY DOWN-CONVERTING APPARATUS

[75] Inventors: Kunio Suesada, Ikoma; Toshiaki Koya, Kadoma; Kunio Sekimoto, Katano, all of Japan

[73] Assignee: Matsushita Electric Industrial Co., Ltd., Osaka, Japan

[21] Appl. No.: 476,731

[22] Filed: Feb. 8, 1990

[30] Foreign Application Priority Data

Feb. 9, 1989 [JP] Japan ................................. 1-30533

[51] Int. Cl.$^5$ ........................ H04N 7/12; H04N 11/02
[52] U.S. Cl. ..................................... 358/13; 358/138
[58] Field of Search ............... 358/13, 12, 21 R, 138, 358/140; 358/17

[56] References Cited

U.S. PATENT DOCUMENTS

| | | | |
|---|---|---|---|
| 4,291,331 | 9/1981 | Devereaux | 358/13 |
| 4,302,776 | 11/1981 | Taylor et al. | 358/160 |
| 4,322,739 | 3/1982 | Drewery | 358/13 |
| 4,651,208 | 3/1987 | Rhodes | 358/12 |
| 4,912,549 | 3/1990 | Altman | 358/17 |
| 5,041,906 | 8/1991 | Matsumoto | 358/13 |
| 5,053,859 | 10/1991 | Lucas | 358/13 |
| 5,055,916 | 10/1991 | Dieterich | 358/12 |

FOREIGN PATENT DOCUMENTS

0341725  11/1989  European Pat. Off. .

Primary Examiner—Tommy P. Chin
Attorney, Agent, or Firm—Wenderoth, Lind & Ponack

[57] ABSTRACT

A sampling frequency down-converting apparatus low-pass converts a digital picture signal sampled at a sampling frequency of 8 Fsc by a thinning out operation into the digital picture signal sampled at a frequency of 4 Fsc, and a sampling frequency up-converting apparatus high-pass converts the digital picture signal sampled at 4 Fsc into one sampled at 8 Fsc by interpolation. If the signal is wider in the required zone than the conventional NTSC signal and the PAL signal like the ATV signal, the transmission and the recording may be effected without the deterioration of the frequency characteristics.

10 Claims, 8 Drawing Sheets

SAMPLING FREQUENCY DOWN-CONVERTING APPARATUS

BACKGROUND OF THE INVENTION

The present invention generally relates to a sampling frequency down-converting apparatus, which makes it possible to effect a recording operation on a recording medium as the digital signals of the comparatively low sampling frequencies or to effect transmission operations among the digital picture apparatuses in spite of the increase in the required frequency zone from the signals of the NTSC system (hereinafter referred to as an NTSC signal) and the signal of the PAL system (hereinafter referred to as a PAL signal), in the signals of systems called an ATV (Advanced Television) system, an HD - MAC (High Definition - Multiplexed Analogue Components) system and so on especially even among the television signals, namely, of the next generation television system which is designed so that the aspect ratio 3:4 of the NTSC system of the current television signal system or of the PAL system may be made as sideways long as 9:16, and the resolution may be improved.

The NTSC signals only will be described hereinafter now that the same things may be said even about the PAL signals. Generally, in a digital picture apparatus such as a digital switcher handling the NTSC signals, a digital video tape recorder (hereinafter referred to as D - VCR) or the like, the NTSC analog signals are sampled at four times the color sub-carrier frequency Fsc, i.e., at 4 Fsc.

From Fsc $\approx 3.58$ MHz, the sampling frequency becomes 4 Fsc $\approx 14.3$ MHz. At this time, the frequency zone of the NTSC signals to be digitized is almost determined by a pre-low-pass filter (hereinafter referred to as an LPF) provided on the input side of an A/D converter. Normally, the flat portion of the frequency characteristics of the LPF is to approximately 5.5 MHz from 0 (direct current). Since the required frequency zone of the NTSC signals is 4.2 MHz, the NTSC signals are digitalized with a surplus by the sampling frequency of 4 Fsc.

An ACTV (Advanced Compatible Television) system is recently worth notice among an ATV system for improving the resolution with the aspect ratio of the above-described NTSC system some systems being made long sideways from 3:4 to 9:16.

The ACTV system only is described hereinafter now that the same thing can be said even about the other ATV systems. In the ACTV system, the field frequency and the color sub-carrier frequency are the same as in the NTSC system. But in the horizontal scanning frequency, there are a case where there is 15.75/1.001 kHz as that of the NTSC system, and a case where there is 31.5/1.001 kHz which is twice 15.75 so as to effect 525 sequential scannings for each one field. The former is called ACTV - E (Advanced Compatible Television - Entry) system, while the latter is called ACTV - 1.

The frequency zone of the ACTV - E system increases by the oblong portion and the horizontal resolution improvement portion as compared with that of the NTSC system. In order to have sideways long portion, the required frequency zone 4.2 MHz of the NTSC system increases as follows.

$$(16/9)/(4/3) \times 4.2 \text{ MHz} = (4/3) \times 4.2 = 5.6 \text{ MHz}$$

In order to further improve the horizontal resolution as compared with that of the NTSC system, the ACTV - E system finally requires the flat frequency zone of 7 MHz.

Also, in the case of ACTV - 1 system, the zone increases twice to effect the sequential scannings with respect to the interlace scanning of the ACTV - E system, thus resulting in 14 MHz.

In a case of digitizing the signals (hereinafter referred to as ACTV signals) of such an ACTV system, in the sampling of the conventional 4 Fsc, the zone to be converted is approximately 5.5 MHz as described hereinabove and is insufficient. Therefore, it is impossible to serve a double purpose the digital picture apparatus of the 4 Fsc sampling for the conventional NTSC system use, which is the original purpose of the ACTV system. Thus, conventionally it has been considered to increase the sampling frequency to 5 Fsc or 6 Fsc. But they are both in a direction of increasing the data rate. The D - VCR for recording them reduces the recording time as compared with the NTSC system in the recording operation on the recording medium of the same capacity. In our time of longer hours' image transcription, it is a big task to be solved for the D - VCR which records the signals in the next generation television system.

SUMMARY OF THE INVENTION

Accordingly, an essential object of the present invention is to provide an apparatus which provides affinity to the digital picture apparatus of the conventional 4 Fsc sampling, and may it possible to effect the sampling for satisfying the required frequency zone of the ACTV.

In accomplishing the above-described object, according to one preferred embodiment of the present invention, in the sampling frequency down-converting apparatus, the sampling frequency thins out the samples of the original digital picture signals eight times the color sub-carrier frequency so that the sampling frequency is converted into the intermediate digital picture signals about four times the color sub-carrier frequency.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
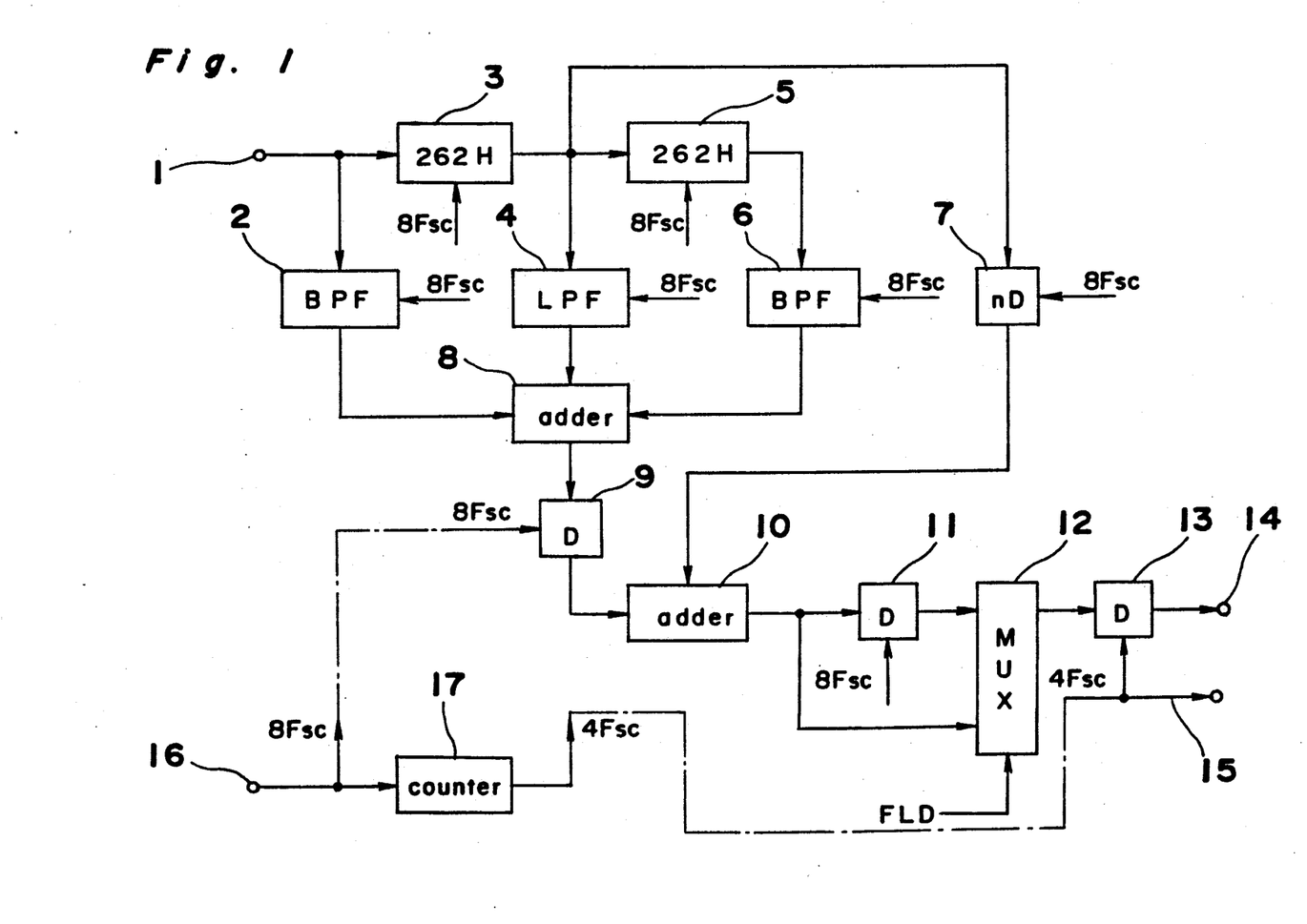
FIG. 1 is a block diagram in one embodiment in accordance with a sampling frequency down-converting apparatus of the present invention.

Referring now to the drawings, there is shown in FIG. 1, a block diagram in accordance with one embodiment of a sampling frequency down-converting apparatus in of the present invention. An original digital picture signal which has sampled a signal (hereinafter referred to as ACTV - E signal) of the ACTV - E system by a 8 Fsc is inputted into a terminal 1. This signal is inputted into a bandpass filter (hereinafter referred to as BPF 2) and also, is line shifted (is delayed by the number of the samples of 262H portion) by each 262H by two 262H delayers 3 and 5. The respective outputs are inputted into an LPF 4 and a BPF 6. Then, the respective outputs of the BPF 2, the LPF 4, and the BPF 6 are added by an adder 8, and also, are delayed by one clock by a data latching circuit (D) 9. After the output of the 262H delayer 3 has been delayed by n clocks (n is a positive integer) for the timing adjustment by the n data latching circuit (nD)7, it is added to the output of the data latching circuit 9 by the adder 10. The added output is delayed by one clock by the data latching circuit (D) 11. In accordance with the field identification signal (FLD) for distinguishing two fields in one frame, the addition output of the adder 10 or the delay output of the data latching circuit 11 is alternately selected for each field to output it (the output means of the FLD is not shown). As shown in the same drawing, the data latching circuits 7, 9, and 11 provided as long as all are latched by the clock of 8 Fsc from the terminal 16 (one sample is delayed by one clock). Then, the output of the MUX 12 is inputted into the data latching circuit (D) 13 and is delayed by one clock by the clock of the 4 Fsc. The clock of the 4 Fsc makes the clock of 8 Fsc from the terminal 16 through the frequency division by the counter 17. The output of the data latching circuit 13, together with the clock of 4 Fsc of the terminal 15 as the intermediate digital picture signal of the sampling frequency of the approximately 4 Fsc, is outputted into the digital interface (not shown) from the terminal 14. The means for thinning out the original digital picture signals is composed of the data latching circuit 11, the MUX 12, and the data latching circuit 13. It is to be noted that the clocks of 8 Fsc to be inputted into the 262H delayers 3, and 5 and the BPFs 2 and 6 and the LPF 4 are also the clocks from the terminal 16.

Figure 2:
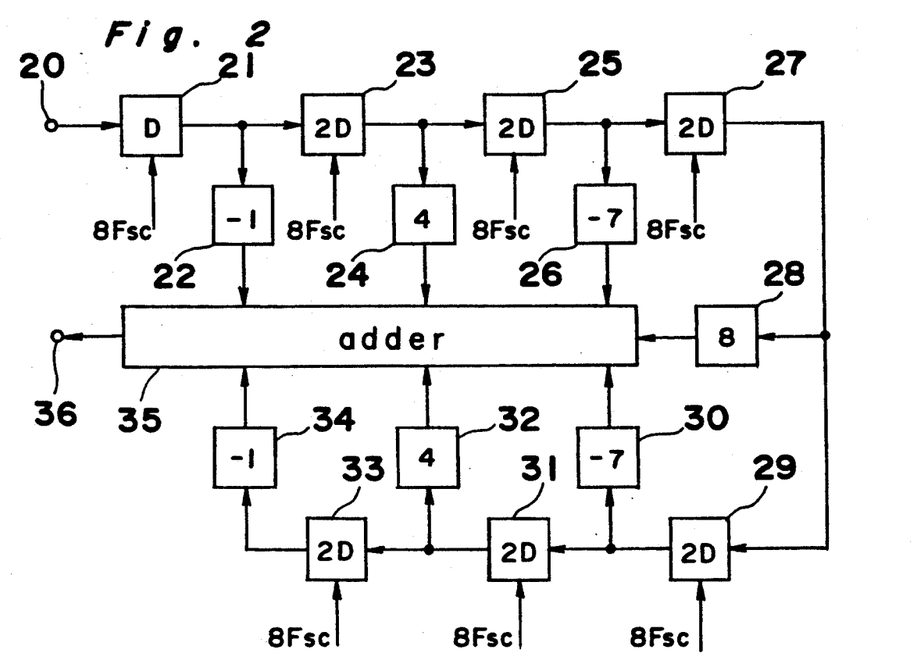
FIG. 2 is a detailed block diagram in one embodiment of a BPF of FIG. 1.
Figure 3:
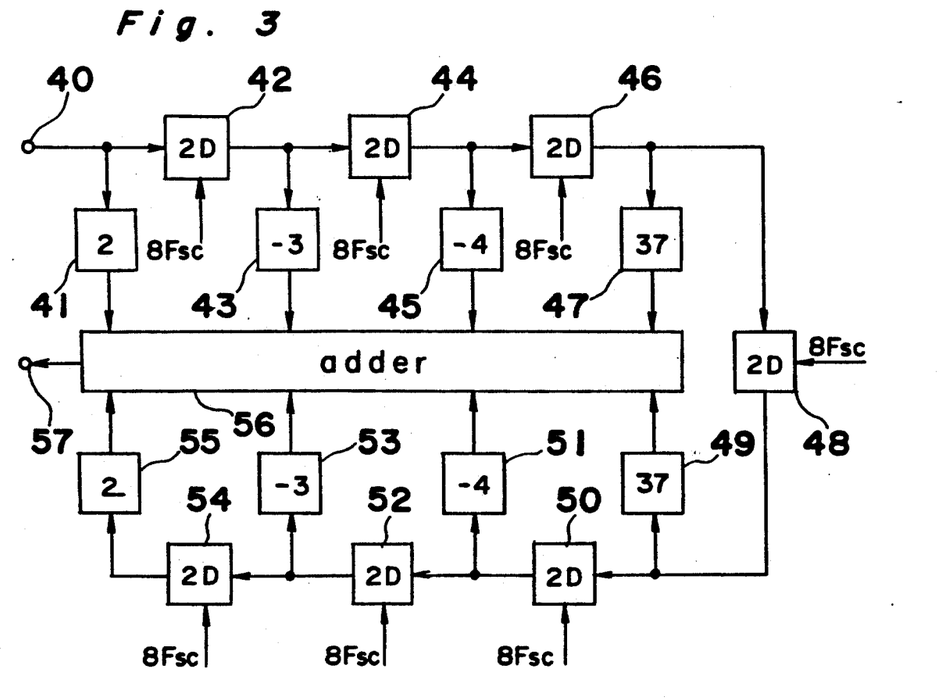
FIG. 3 is a detailed block diagram in one embodiment of a LPF of FIG. 1.

The BPF 2 and BPF 6 are completely the same in construction. The detailed block diagram in accordance with one embodiment thereof is shown in FIG. 2. In FIG. 2, only the data latching circuit (D) 21 is a circuit for delaying by one clock. The other data latching circuits (2D) 23, 25, 27, 29, 31, and 33 are the circuits for delaying by two clocks. The signals from the terminal 20 are shifted by these data latching circuits. The output of each data latching circuit is multiplied respectively by coefficients −1, 4, −7, 8, −7, 4, and −1 by the coefficient multipliers 22, 24, 26, 28, 30, 32, and 34. Seven outputs of these coefficient multipliers 22, 24, 26, 28, 30, 32, and 34 are added by the adder 35 and are outputted into the terminal 36. Also, FIG. 3 is a detailed block diagram in one embodiment of the LPF 4. In FIG. 3, the signals from the terminal 40 are shifted by the data latching circuits (2D) 42, 44, 46, 48, 50, 52, and 54 which delay by two clocks. Also, the signal of the terminal 40 and the output of each data latching circuit is multiplied respectively by the coefficients 2, −3, −4, 37, 37, −4, −3, and 2 by the coefficient multipliers 41, 43, 45, 47, 49, 51, 53, and 55, and eight outputs of these coefficient multipliers 41, 43, 45, 47, 49, 51, 53, and 55 are added by the adder 56 and are outputted into the terminal 57.

The operation of the sampling frequency down-converting apparatus (see FIG. 1) composed of BPFS and LPFS and so on will be illustrated using FIGS. 4(a)–4(c) and FIG. 5. FIG. 4 (a) through 4 (c) are the frequency spectrum by the various types of samplings. The scale of the quadrature axis is shown in Fsc unit and MHz unit. FIG. 4 (a) shows a case where the sampling has been effected by the sampling frequency of 4 Fsc, wherein the zone of the analog ACTV signal to be sampled in advance by the LPF and so on before the analog/digital (A/D) conversion is effected is limited to 2 Fsc (7.16 MHz), thereafter the A/D conversion is effected, so that a Y signal component of base band spectrum 60 (oblique line portion surrounded in solid lines) containing a C signal component 61 around the color sub-carrier wave and a folded spectrum 62 (oblique line portion surrounded by dotted lines) around the 4 Fsc may not be overlapped with the 2 Fsc provided as the boundary. FIG. 4 (b) shows a case where the sampling has been effected by the sampling frequency of the 8 Fsc. Since the folded spectrum 64 around the 8 Fsc is sufficiently higher than the base band spectrum 63, the zone restriction is not required to be effected in advance as in FIG. 4(a). The zone of the ACTV signal to be sampled may be extended over necessary 2 Fsc. Therefore, the flat frequency characteristics may be obtained till 2 Fsc, i.e., 7. 16 MHz as shown. FIG. 4 (c) shows the frequency spectrum in a case where the original digital signal sampled by the sampling frequency of the 8 Fsc as in the (b) is thinned out (sampling) every other sample and is converted into the digital signal (hereinafter referred to as intermediate digital signal) of approximately 4 Fsc of the sampling frequency. At this time, the base band spectrum 66 (right-rising oblique lines portion surrounded by solid lines) and the folded spectrum 68 (left-rising oblique line portion surrounded by dotted lines) are overlapped on each other in the piled up region 67 (cross portion). Since the frequency spectrum of the picture signal normally has the energies concentrated at the interval between the horizontal frequency Fh and the field frequency Fv, the base band spectrum 66 and the folded spectrum 68 have the relationship of the frequency interleaving just in the piled up region 67 if the sub-sampling frequency for obtaining the intermediate digital signal is shifted by Fh/2 or Fv/2 with respect to the 4 Fsc. In order to restore it into the analog ACTV signal, the frequency characteristics may provide the flat ACTV signal as long 2 Fsc if the digital analog conversion (D/A) is effected after the signal has been restored to the original digital signal of the sampling frequency 8 Fsc through the interpolation of the thinned out samples. Normally the color sub-carrier wave is selected into a proper frequency (odd times of one half of the fH), the C signal is modulated by the color sub-carrier wave to effect the frequency interleaving. Thus, the piled up region 67 is better not to be applied upon the zone of the C signal component 65.

Figure 5:
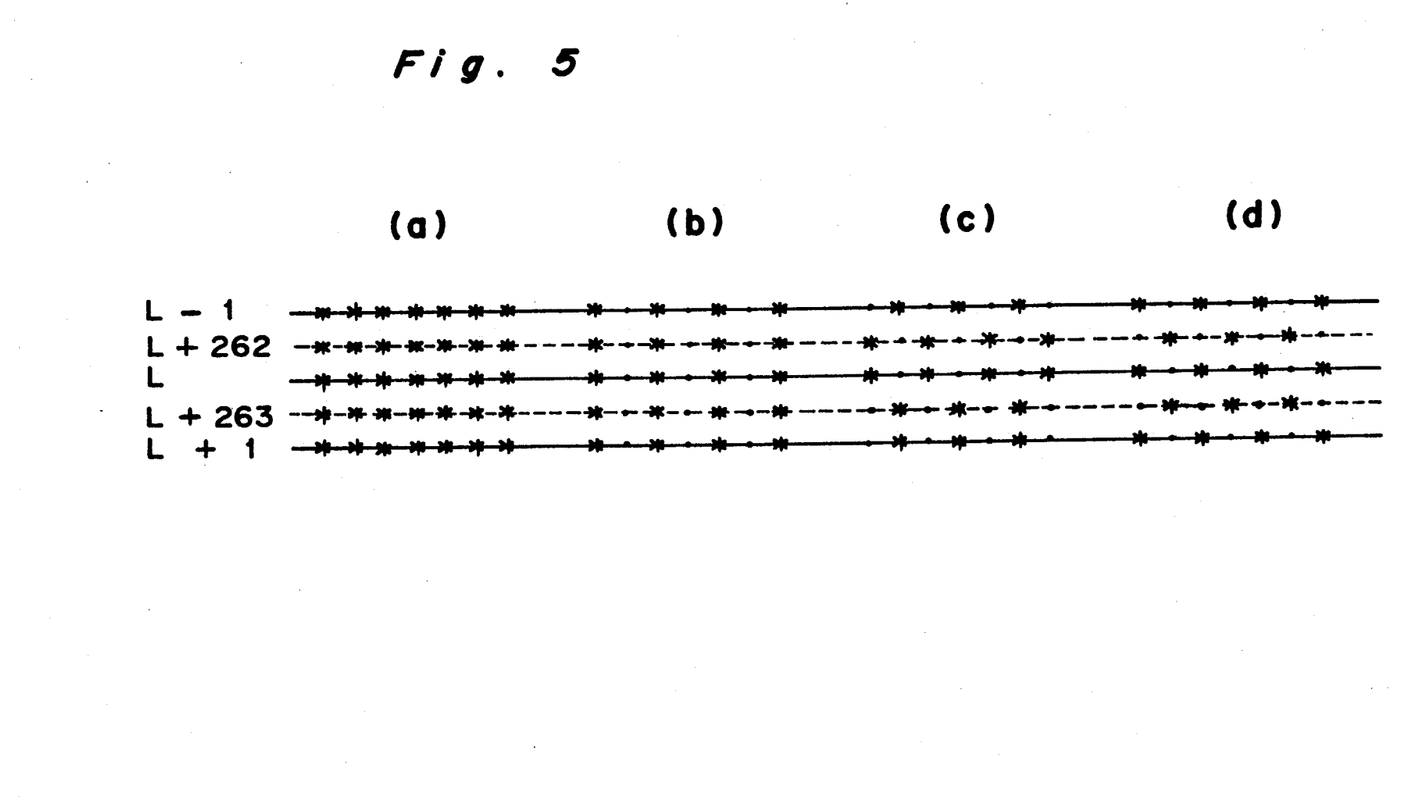
FIG. 5 shows a two-dimensional model view of the various types of samplings.

The sub-sampling method will be described hereinafter by the use of FIG. 5. In FIG. 5, the sampling position of the two field portions and the thinning out position are represented respectively "*" and "." in the two-dimensional terms. The solid lines and the dotted lines respectively show scanning lines. The difference in the field is represented by the difference between the solid lines and the dotted lines. Section (a) of FIG. 5 shows a case of the sampling by the sampling frequency of the 8 Fsc. Section (b) of FIG. 5 shows a case of the sampling by the sampling frequency of the 4 Fsc to be thinned out for every other sample from section (a). Section (c) of FIG. 5 shows a case of a so-called line offset type, where one sample is shifted every other line in the thinning out method. Section (d) of FIG. 5 is a case of a so-called field offset type, where one sample is shifted every other field in the thinning out method.

At this time, the sampling frequency of section (c) is shifted by fh/2 from the 4 Fsc, while the sampling frequency of section (d) is shifted by fv/2 from the 4 Fsc.

One embodiment of the sampling frequency down-converting apparatus in the present invention of FIG. 1 realizes the field offset type of section (d) of FIG. 5.

Figure 4A:
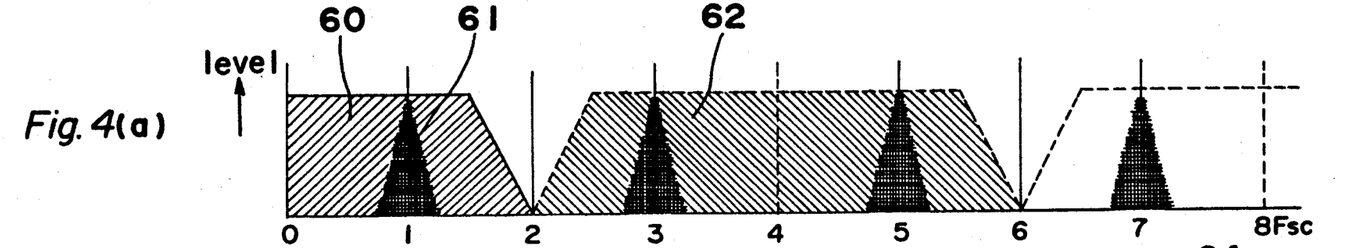
FIGS. 4(a)–4(c) respectively show a frequency spectrum in each type of sampling.
Figure 4B:
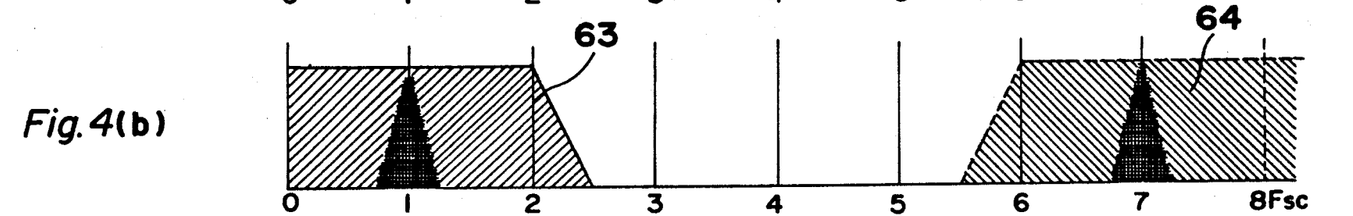
Figure 4C:
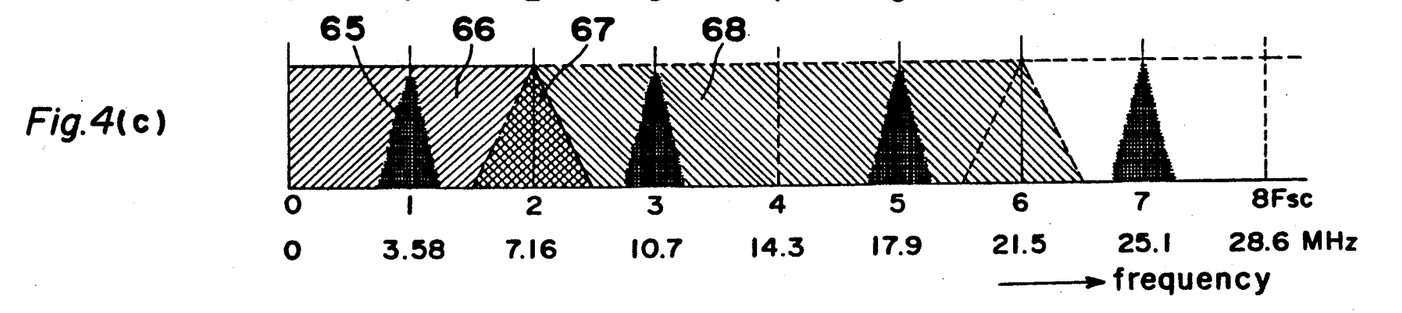
Figure 6:
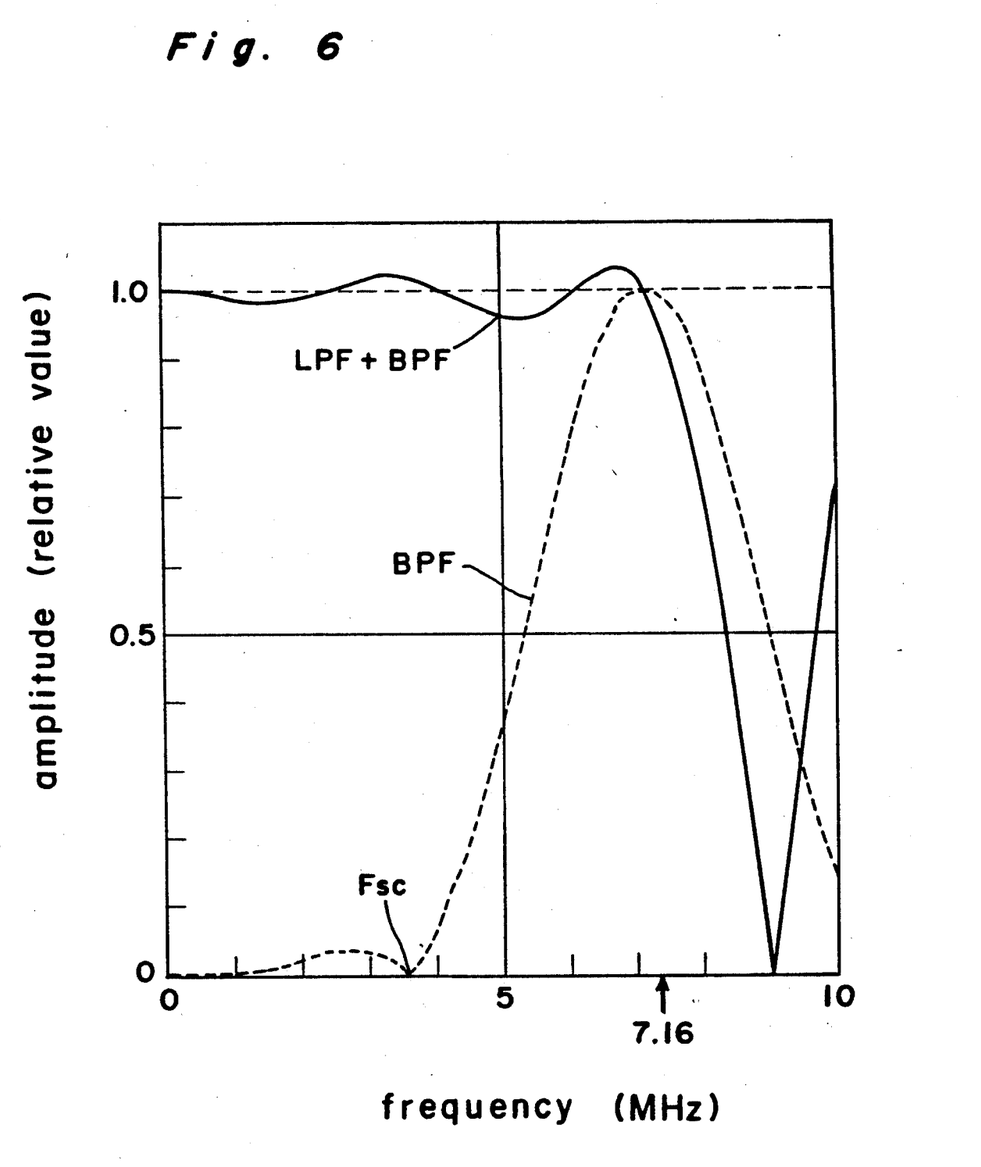
FIG. 6 shows a frequency characteristic graph of the BPF and LPF of FIG. 1.

In FIG. 1, a circuit from the terminal 1 to the output of the adder 10 is a so-called zone restricting filter. When the original digital signal has been sub-sampled by the sampling frequency of approximately 4 Fsc so as to become such a frequency spectrum as shown by FIG. 4 (c), the component of the folded spectrum 68 in the piled up region 67 is previously restricted in zone by the chasing filter of the Fv period only in only the passing zone of the BPF so that the component distribution is not be leaked into the component within the base band spectrum 66 separated by Fv/2. The frequency characteristics of the zone restricting filter (composed of the terminal 1 through the adder 10) is shown in FIG. 6 in a case where the BPFs 2, 6 and the LPF 4 shown in FIG. 2, FIG. 3 are used. The frequency characteristics shown in the dotted lines become the direct current (DC) in the 2 Fsc (7.16 MHz) of the central frequency, and zero in the Fsc. Thus, the bad influence to be applied upon the C signal component becomes minimum. The chasing filter in the passing zone of the BPF is omitted, since the filtering is effected at the fv period, which is difficult to illustrate. Namely, the envelope of the frequency characteristics of the chasing filter shape looks as if it is the frequency characteristics of the BPF shown in the dotted lines. The overall characteristics containing the LPF shown in the solid lines become the flat characteristics of approximately 1 dB from the DC to the 2 Fsc.

In the circuit from the output of the adder 10 to the terminal 14 of FIG. 1, the original signals sampled by the sampling frequency of the 8 Fsc are thinned out every other sample to generate the intermediate digital picture signal of approximately 4 Fsc in the sampling frequency. The field offset type is realized by the passing of the output of the data latching circuit 11 every other field in the MUX 12. If a circuit (which is composed of the terminal 1 through the adder 10) constituting the zone limiting filter is omitted here, the fundamental performance of sampling with the 4 Fsc the original digital signal sampled by the 8 Fsc in accordance with the present invention may be achieved.

Figure 7:
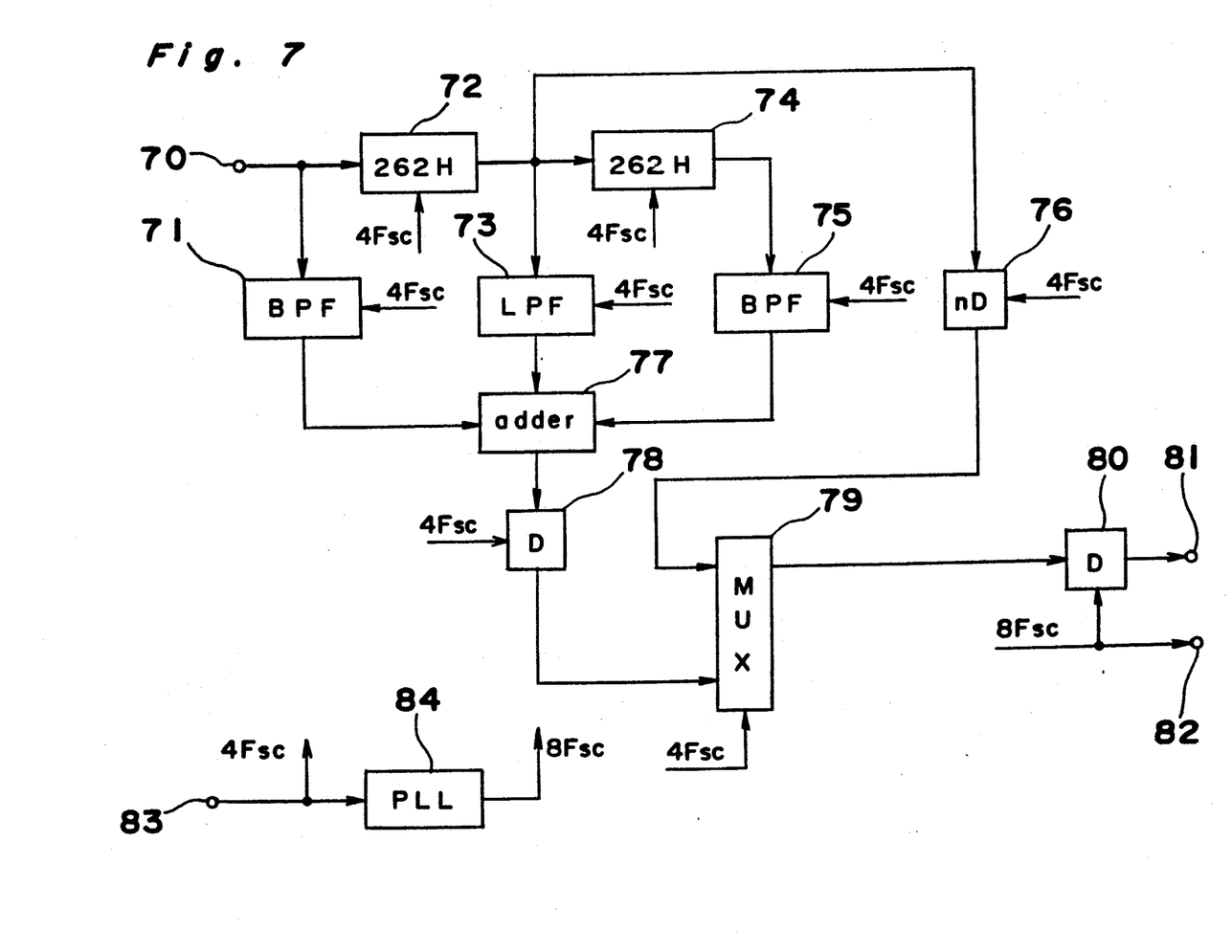
FIG. 7 is a block diagram in accordance with one embodiment in a sampling frequency up-converting apparatus of the present invention.

FIG. 7 is a block diagram in accordance with one embodiment of a sampling frequency up-converting apparatus of the present invention. In FIG. 7, the intermediate digital picture signal sub-sampled by the sampling frequency (sub-sampling frequency) of the approximately 4 Fsc is inputted into the terminal 70 through the digital interface (not shown). This signal is inputted into the BPF 71, and also, is inputted into the 262H delayer 72. The line shifting is effected for each 262H by two 262H delayers 72 and 74 so as to input the respective outputs into the LPF 73 and the BPF 75. The respective outputs of the BPF 71, LPF 73 and BPF 75 are added by the adder 77, and also, are delayed by one clock by the data latching circuit (D) 78. An interpolating sample producing means is composed of the BPF 71, the 262H delayer 72, the LPF 73, the 262H delayer 74, the BPF 75, the adder 77, and the D 78. The output of the 262H delayer 72 is delayed by n clocks (n is a positive integer) for the timing adjustment by the n data latching circuit (nD) 76. The delay output and the output of the data latching circuit 78 are selected by a MUX 79. As shown in the same drawing, the data latching circuits 76 and 78 are all latched (one sample is delayed by one clock) by the clock of 4 Fsc from the terminal 83. Since the selection of the MUX 79 is effected likewise by the clock (rate) of the 4 Fsc from the terminal 83, the output of the data latching circuit 78 and the output of the n data latching circuit 76 alternately appear at the rate of the 8 Fsc finally in the output of the MUX 79. It is inputted into the data latching circuit (D) 80 and is delayed by one clock by the clock of the 8 Fsc. The clock of the 4 Fsc is made twice by the PLL 84 to make this 8 Fsc clock. The output of the data latching circuit 80, together with the 8 Fsc of the terminal 82, is outputted externally as the original digital signal from the terminal 81. The interpolating sample filling means is composed of the MUX 79, the D 80. It is to be noted that the clocks of the 4 Fsc to be inputted into the 262H delayers 72 and 74, the BPFs 71 and 75 and the LPF 73 are the clocks from the terminal 83.

Figure 8:
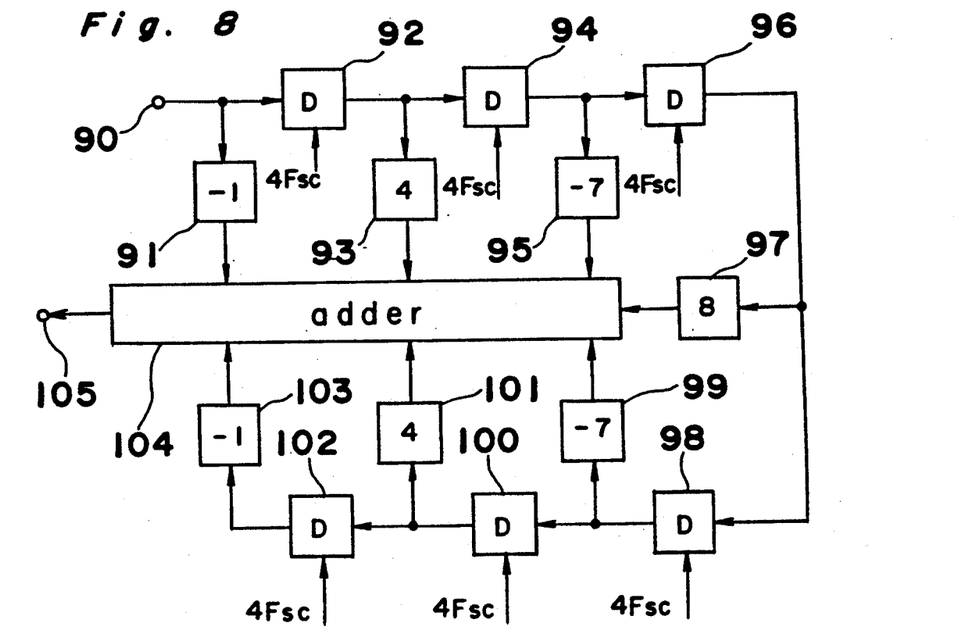
FIG. 8 is a detailed block diagram in accordance with one embodiment of the BPF of FIG. 7.

The BPF 71 and the BPF 75 are completely the same in construction. The detailed block diagram in accordance with one embodiment thereof is shown in FIG. 8. In FIG. 8, the signal from the terminal 90 is shifted by the data latching circuits (D) 92, 94, 96, 98, 100, and 102 for delaying one clock, and also, the signal of the terminal 90 and the output of each data latching circuit are multiplied by the same coefficients −1, 4, −7, 8, −7, 4, and −1 as those of the coefficient multiplier shown in FIG. 2 respectively by the coefficient multipliers 91, 93, 95, 97, 99, 101, and 103, and seven outputs of these coefficient multipliers 91, 93, 95, 97, 99, 101, and 103 are added by the adder 104 so as to be outputted into the terminal 105.

Figure 9:
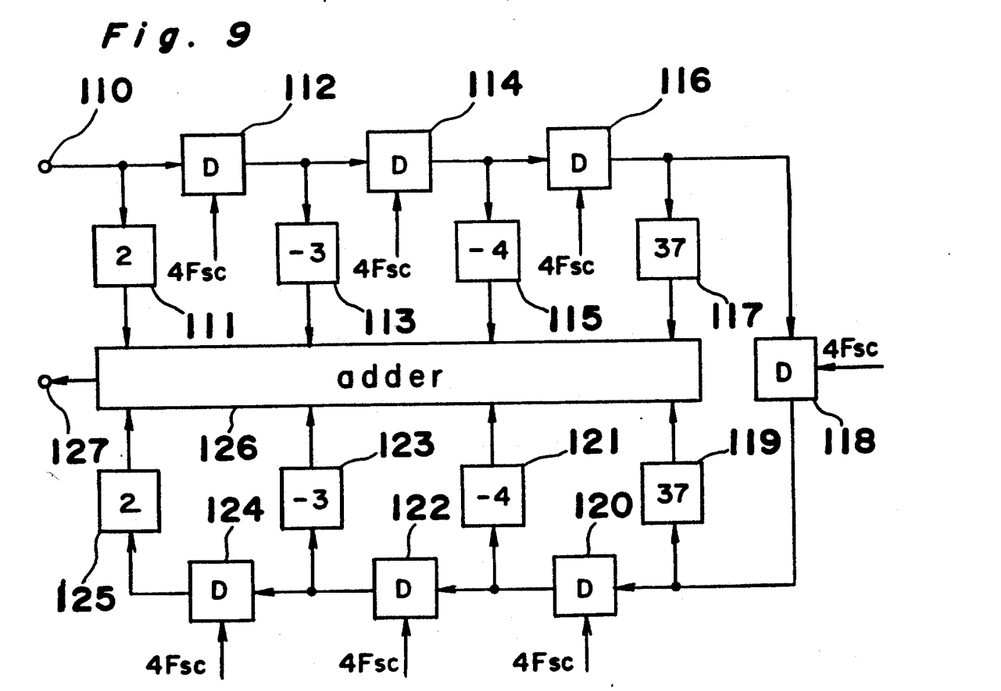
FIG. 9 is a detailed block diagram in accordance with one embodiment of the LPF of FIG. 7.

FIG. 9 is a detailed block diagram in accordance with one embodiment of a LPF 73. Since the same drawing is the same as FIG. 3 wherein the data latching circuit for delaying by two clocks is changed into a latching circuit (D) for delaying by one clock, the description thereof will not be described.

Figure 10:
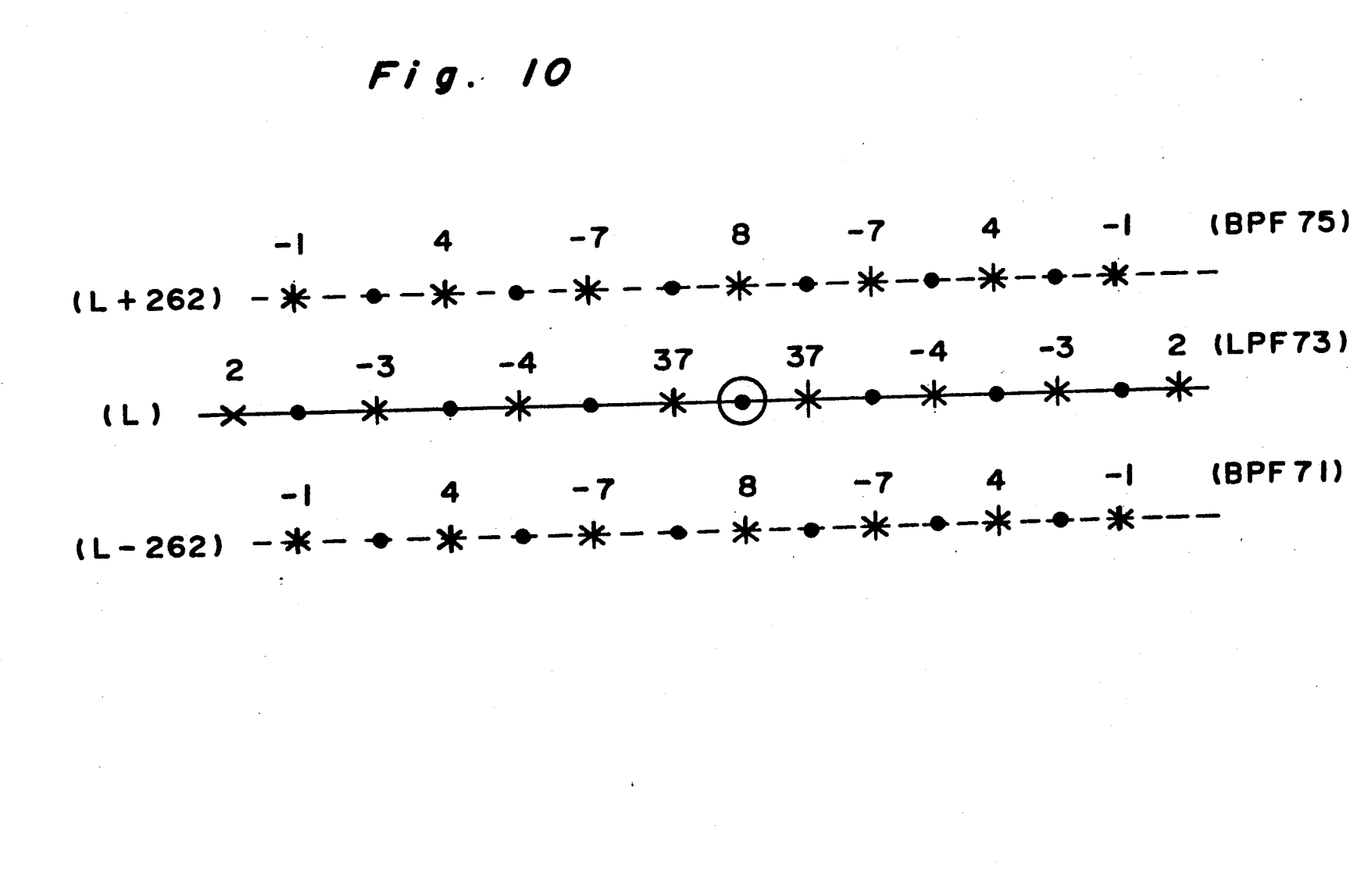
FIG. 10 is a model view for illustrating the interpolation processing.

In a sampling frequency up-converting apparatus of such a construction, the output of the data latching circuit 78 becomes an interpolating output which has interpolated the thinned out sample "." shown in section (d) of FIG. 5 from the sample of the surrounding "*". The interpolating method will be briefly described with reference to FIG. 10. FIG. 10 shows as a model the operations of the 262H delayers 72, and 74 of the sampling frequency up-converting apparatus shown in FIG. 7 and the respective filters 71, 73, and 75. In FIG.

10, the (L+262) line is the output of the BPF 75, the (L−262) line is the output of BPF 71, the numeral shown on the sample "*" is the coefficient of the coefficient multiplier shown in FIG. 8. The (L) line is the output of the LPF 73, the numeral shown on the sample "*" is the coefficient of the coefficient multiplier shown in FIG. 9. The sample "o" is the thinned out sample to be interpolated. The sample is multiplied by the coefficient shown on the sample "*" and the total sum of them is removed to interpolate the sample "o". Such an original digital signal as shown in FIG. 5 (a) is provided by the alternate replacement by the output sample "*" of the n data latching circuit 76 in the MUX 79. The frequency characteristics of the BPF and the LPF of FIG. 7 are shown in FIG. 6 as shown in those of the BPF and the LPF of FIG. 1.

If the coefficients of the coefficient multipliers of the BPF and the LPF are set respectively −5, 16, −27, 32, −27, 16, and −5, and 8, −10, and −18, 148, 148, −18, −10, 8, the frequency characteristics are further improved and the circuit scale increases somewhat.

In the above-described embodiment of the present invention, the 8 Fsc sampling of the ACTV - E signal has been considered to be the original digital signal, but the sampling frequency of the 8 Fsc is too low, because the required zone becomes 14 MHz in the ACTV - 1 signal. In the case of the ACTV - 1 signal, the signal sampled by the sampling frequency of the 16 Fsc is to be the original digital picture signal. It is low-pass converted into the intermediate digital picture signal of approximately 8 Fsc by the thinning out method (sub-sampling) of the field offset or the like. Also, the intermediate digital picture signal of the approximately 8 Fsc is restored into the original digital picture signal of the 16 Fsc by the interpolation. In the embodiment, all the clocks in the embodiment where the above-described original digital signal has been made the ACTV - E signal have only to be made twice. At this time, the central frequency of all the above-described BPFs becomes 4 Fsc.

As described hereinabove, in accordance with the present invention, the digital interface provided between the digital picture apparatuses, by the use of the intermediate digital signal of approximately 4 Fsc, with respect to the ACTV - E signal requiring the flat signal zone of the 7 MHz, so that most of the digital picture apparatuses including a digital VTR using the sampling frequency of the conventional 4 Fsc may be used as they are. Furthermore, the recording time and the format of the DVCR may be provided as in a case where the recording signal is the NTSC signal. The flat signal may be provided as far as 2 Fsc=7.16 MHz if the digital/analog is effected through the restoration into the original digital picture signal of the 8 Fsc by the interpolation in the restoration into the analog signal. Also, the realization may be effected likewise by the use of the intermediate digital signal of the approximately 8 Fsc with respect to the ACTV - 1 requiring the flat zone of the 14 MHz, so that the large effect may be expected.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. A sampling frequency down-converting apparatus comprising a means for sampling original digital picture signals at a sampling frequency of 8 Fsc (Fsc: color sub-carrier frequency) so as to thin out said sampled picture signals and a means for low-pass converting said sampled picture signals into intermediate digital picture signals having a sampling frequency of 4 Fsc ±Fh/2 (Fh: horizontal scanning frequency) or 4 Fsc ±Fv/2 (Fv: field frequency).

2. A sampling frequency down-converting apparatus comprising: a first delay means for delaying by 262H an original digital picture signal having a sampling frequency of 8 Fsc (Fsc: color sub-carrier frequency); a first filter for zone restricting the delay output of the first delay means; a second filter for zone restricting the original digital picture signal; a first adder for adding the output of the first filter and the output of the second filter; a second delay means for delaying the delay output of the first delay means by n samples (n is a positive integer; a second adder for adding the output of the first adder and the output of the second delay means; a means for thinning out a processed original digital picture signal having a sampling frequency of 8 Fsc which is the output of the second adder into an intermediate digital picture signal, which has a sampling frequency of approximately 4 Fsc.

3. A sampling frequency down-converting apparatus described in accordance with the claim 2, wherein the central frequency of the frequency characteristics of the second filter is made twice the color sub-carrier frequency.

4. A sampling frequency down-converting apparatus described in accordance with the claim 3, wherein the characteristics of the second filter becomes 0 in amplitude at the color sub-carrier frequency.

5. A sampling frequency down-converting apparatus described in accordance with the claim 3, wherein the coefficient multiplier constituting the second filter has coefficients which are made the seventh of −1, 4, −7, 8, −7, 4, −1, in the order of the flow of the original digital picture signal.

6. A sampling frequency down-converting apparatus described in accordance with the claim 3, wherein the coefficient multiplier constituting the second filter are made the seventh of −5, 16, −27, 32, −27, 16, −5 in the order of the flow of the signals.

7. A sampling frequency down-converting apparatus comprising a means for sampling original digital picture signals at a sampling frequency of N Fsc (Fsc: color sub-carrier frequency and N is an integer =16, 8) so as to thin out said sampled picture signals and a means for low-pass converting said sampled picture signals into intermediate digital picture signals when have a sampling frequency of N/2 Fsc ±Fv/2 (Fh: horizontal scanning frequency) or N/2 Fsc ±Fv/2 (Fv: field frequency).

8. A sampling frequency down-converting apparatus comprising a first delay means for delaying by 262H an original digital picture signal having a sampling frequency of N Fsc (Fsc: color sub-carrier frequency and N is an integer =16, 8); a first filter for zone restricting the delay output of the first delay means; a second filter for zone restricting the original digital picture signal; a first adder for adding the output of the first filter and the output of the second filter; a second delay means for delaying the delay output of the first delay means by n samples (n is a positive integer; a second adder for adding the output of the first adder and the output of the second delay means; a means for thinning out a processed original digital picture signal having a sampling frequency of N/2 Fsc which is the output of the second adder into an intermediate digital picture signal, which has a sampling frequency of approximately N/4 Fsc.

9. A sampling frequency down-converting apparatus descried in accordance with claim 8, wherein the central frequency of the frequency characteristics of the second filter is made twice the color sub-carrier frequency.

10. A sampling frequency down-converting apparatus described in accordance with claim 9, wherein the characteristics of the second filter becomes o in amplitude at the color sub-carrier frequency.

* * * * *